INVENTORS
JOSEPH M. BLUM
KWANG K. SHIH
BY George Baron
ATTORNEY 3,846,191

LIQUID PHASE EPITAXY OF $Al_xGa_{1-x}As$

Joseph M. Blum, Yorktown Heights, and Kwang K. Shih, Ossining, N.Y., assignors to International Business Machines Corporation, Armonk, N.Y.

Filed Mar. 31, 1971, Ser. No. 129,734
Int. Cl. H01l 7/38
U.S. Cl. 148—172 6 Claims

ABSTRACT OF THE DISCLOSURE

Efficient light-emitting diodes have been made from liquid phase epitaxially grown p-n junctions in $$Al_xGa_{1-x}As.$$

Light-emitting diodes made from similar p-n junctions, where a simple diffusion process is employed to make the p-n junctions, results in less efficient diodes. By adding a 5° to 10° C. heating step prior to completing the liquid phase epitaxial growth of (GaAl)As, a substantial increase in the efficiency of light-emitting p-n junctions which are subsequently made by diffusion procedures is achieved. By increasing the efficiency of p-n junctions using diffusion procedures, monolithic fabrication of light-emitting arrays can be achieved.

OTHER RELATED INVENTIONS

An application entitled "Preparation of Semi-Conductor Ternary Compounds," Ser. No. 646,315, filed June 15, 1967, now U.S. Pat. 3,773,571, in the names of Hans S. Rupprecht and Jerry M. Woodall, and assigned to the same assignee as the instant application, deals with the basic invention for growing, by the method of liquid phase epitaxy (LPE), the compound used by applicants. This invention departs from that basic invention by interrupting the cooling process of Rupprecht and Woodall and adding a temperature increase for a limited time so as to achieve a remelting cycle in the LPE growth. Such remelting cycle is the basic thrust of the present invention.

BACKGROUND OF THE INVENTION

The liquid phase epitaxy method of solution growth has been applied to the ternary compound semiconductor, $Ga_{1-x}Al_xAs$, for nearly the complete solid composition. Epitaxial deposition of $Ga_{1-x}Al_xAs$ has been achieved on GaAs substrates. In a paper entitled "Liquid Phase Epitaxial Growth of $Ga_{1-x}Al_xAs$," by J. H. Woodall et al. which appeared in the Journal of Electrochemical Society: Electrochemical Technology, June 1969, pp. 899–903 there appears a detailed discussion of the factors that determine the metallurgical and chemical nature of the layers grown. In such paper, a grown p-n junction is normally made during a liquid phase epitaxial process by first growing an n-type AlGaAs layer. A p-type layer is formed on such n-type layer by adding a p-type impurity, for example, zinc, to the gallium liquid solution and raising the temperature approximately 5° to insure uniform distribution of the zinc into the melt before further growth is continued.

The above noted manner of making a p-n junction diode, while it leads to a relative efficient light-emitting diode (see copending application, Ser. No. 646,315 noted hereinabove), does not lend itself toward the making of batch-fabricated diodes using monolithic techniques. For monolithic fabrication, it is desirable to have a large area of an n-type AlGaAs layer be exposed, through suitable masking techniques, to a diffusion of zinc from a common source of zinc vapor so that large numbers of junctions can be made on a single plane. However, junctions made by the diffusion technique are not as efficient as those that are prepared by the LPE method set out in such copending application by Rupprecht et al.

The method of Rupprecht et al. has been modified so that during the LPE growth of an n-type AlGaAs layer, the cooling cycle is interrupted and the temperature of the melt is raised 5°–10° C., and then one waits for about five minutes, before allowing the cooling rate to continue. During this interim heating step, no dopant is added to the melt, but a remelting cycle melts a thin surface layer of the epitaxial overgrowth prior to the regrowth of another thin layer at that surface. By subsequently diffusing a dopant, such as zinc, in the epitaxial layer near where the remelting cycle took place, the quantum efficiency of the p-n junction diodes so produced is many higher than the quantum efficiency of those diffused diodes that were made without this remelting cycle.

Thus it is an object of this invention to provide a modified liquid phase epitaxial growth of $Al_xGa_{1-x}$ or a similar ternary compound.

It is a further object to prepare an n-type layer of $$Al_xGa_{1-x}As$$

by LPE growth so that a subsequent diffusion of a dopant into such layer will produce p-n junctions having improved quantum efficiencies.

The foregoing and other objects, features and advantages of the invention will be aparent from the following more particular description of the preferred embodiments of the invention as illustrated in the accompanying drawings.

DESCRIPTION OF THE INVENTION

Figure 1:
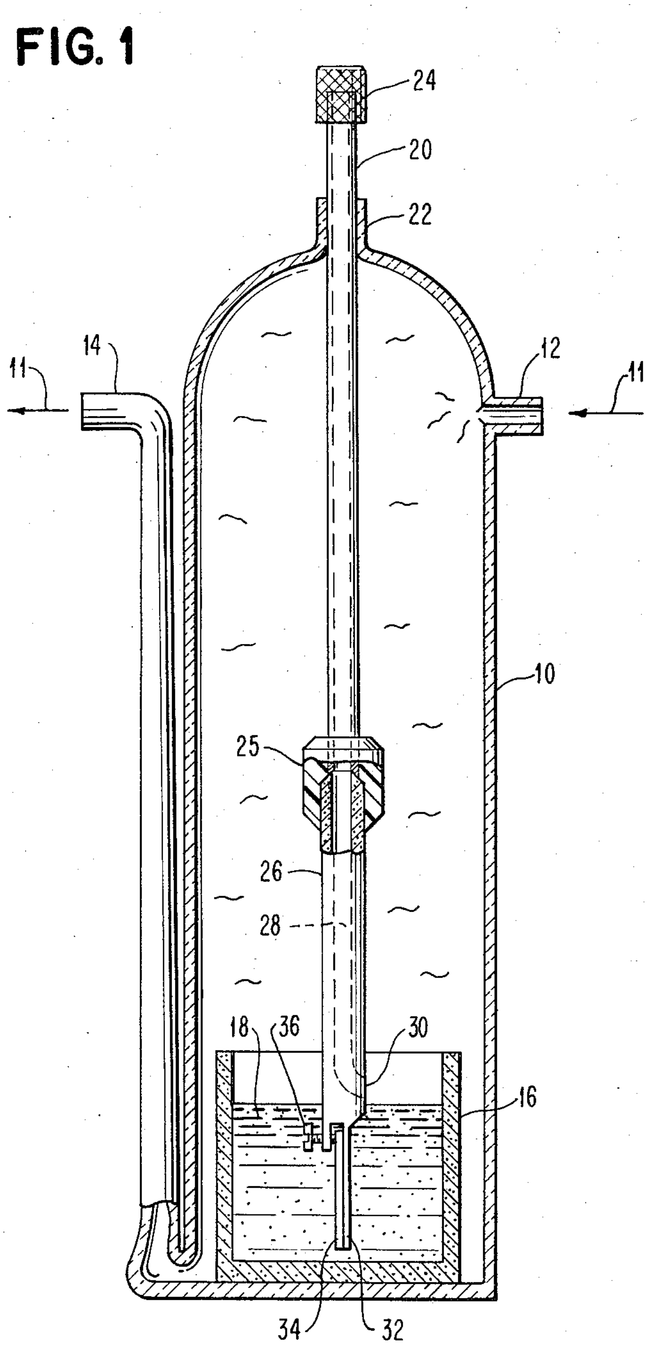
FIG. 1 is a sectional view of an apparatus useful for effecting growth by liquid phase epitaxy of a semiconductor ternary compound.

A means for growing a semiconductor crystal compound such as $Al_xGa_{1-x}As$ using a vertical furnace is shown in FIG. 1. Such means is merely illustrative of one method of LPE growth of the ternary compound AlGaAs. The vertical method carried out by the apparatus shown in FIG. 1 can be replaced by an apparatus that grows by a horizontal method. A quartz chamber 10 is provided within which one prepares the semiconductor crystal compound. Orifice 12 is the inlet for a high impurity inert gas 11 used during the LPE growth and orifice 14 is the exit port of such inert gas. A crucible 16 of $Al_2O_3$ or other material that is inert to the LPE process is inserted into chamber 10 and the components of the chosen ternary compound, e.g., Ga, Al and As and a n-type dopant such as Te, etc. are heated to a molten liquid 18, by a conventional furnace, not shown. Such molten liquid is in equilibrium at a given temperature.

A quartz tube 20 is inserted into chamber 10 via orifice 22, onto which is placed a removable cap 24, such tube 20 being connected by inert coupling 25 to a graphite section 26 which has a tube portion 28 therein that connects tube 20 to chamber 16 via orifice 30. Graphite section 26 is machined to have a lower extending portion 32 upon which a solid substrate, e.g., a single crystalline GaAs layer 34 is affixed by a suitable locking device such as screw 36. The crucible 16 is selected which does not react with the components of the liquid 18 at the temperature of growth of the crystalline compound. A suitable pressure of inert gas 11, of which argon and helium are examples, is introduced at orifice 12 and maintained in chamber 10 to inhibit vapor formation of the highly volatile components in liquid 18.

In an illustrative but not a limiting operation for growing a layer of $Al_xGa_{1-x}As$, crucible 16 is loaded with the components Ga, Al and As, forming a suitable liquid in equilibrium at a given temperature, e.g., 20 gms. Ga, 0.055 gms. Al (where Al can vary from 0<0.200 gms.), and excess of pure GaAs, e.g., 3.5 gms. GaAs. When required, a dopant of one conductivity type is established in a predetermined concentration in liquid 18. To establish an n-type semiconductor, prepared with the foregoing components, about 0.003 grams of tellurium Te) is introduced with liquid 18. The crucible 16 is introduced into chamber 10 through an access port, not shown, and the quartz tube 20 and graphite portion 26 ore coupled via connection 25 to substrate 34 via extending portion 32. Substrate 34 is a self-supporting unit of GaAs whose main surface face is perpendicular to the <100> crystalline direction.

In performing an LPE growth of $Al_xGa_{1-x}As$, chamber 10 is placed in an isothermal furnace, not shown, so that the chamber is maintained at a given temperature equilibrium with the liquid 18, which temperature is about 950°–960° C. Substrate 34 is then immersed in the liquid 18 so that it achieves equilibrium with liquid 18 at the operational temperature. In one representative LPE growth cycle, liquid 18 was lowered by 20° C. before introducing substrate 34 and after the latter had been introduced into liquid 18, the temperature of the latter was raised by 10° C. so that the temperature at which the initiation of growth occurred was 955° C. The raising of the temperature by 10° C. resulted in a good melting of the melt to the GaAs substrate 34. For a uniform composition of a grown layer of $Al_xGa_{1-x}As$ on substrate 34, a preferred cooling rate was 0.5° C. to 1.0° C. per minute, and such cooling rate was continued until a desired layer of thickness of the crystalline compound was obtained.

Figure 2:
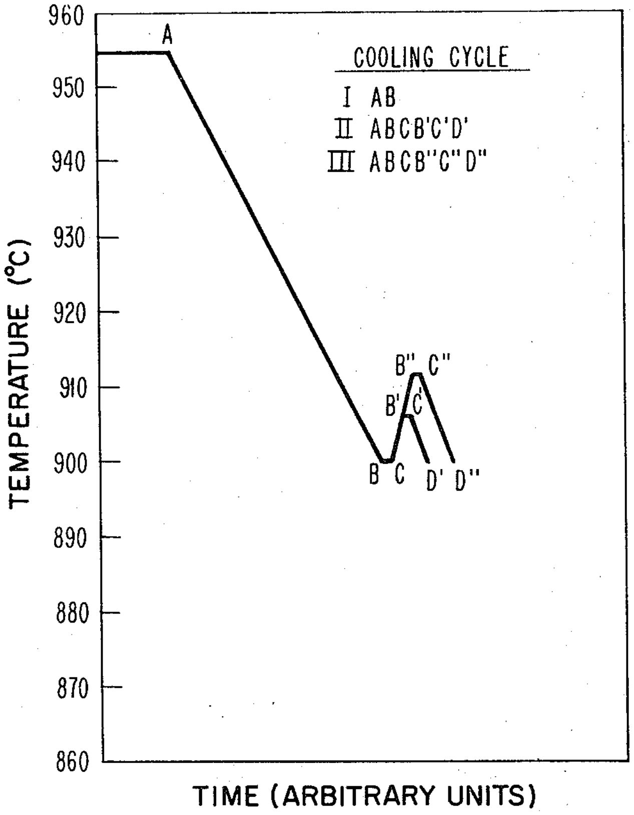
FIG. 2 is a temperature-time plot of the LPE growth of $Al_xGa_{1-x}As$ in accordance with the teachings of this invention.

FIG. 2 illustrates a typical cooling cycle of the LPE growth of $Al_xGa_{1-x}As$ for achieving the benefits of the present invention. The melt was initially heated to 955° C. (point A) and then cooled to about 900° C. at a cooling rate of about 0.4° C./minute, using Te as the n-type dopant, for deposition onto the substrate 34 of single crystal GaAs having a <100> orientation.

An epitaxial layer was grown by cooling the solution at the above noted rate of 0.4° C./minute until 900° C. (point B) was reached, at which point the temperature was maintained 5 minutes to point C and then raised either 5 degrees to 905° C. (point B′) or 910° C. (point B″), maintained at either of these temperatures for 5 minutes (see points C′ or C″), then cooled to 900° C. at the same rate of 0.4° C./minute until either D′ or D″ is reached. Whether one stops at D′ or D″, or continues cooling along line C′D′ or C″D″, is determined by the depth of the subsequent diffusions of p-type dopants in making LED's. Consequently, cooling stops in the vicinity of 900° C., either above or below, to produce a regrown layer of the order of a few microns.

Epitaxial layers using cooling cycles I, II or III as shown in FIG. 2 were grown. The melt was heated to 955° C. and cooled at a rate about 0.4° C./minute to 900° C. for cooling cycle I. For layers grown with a remelting cycle, the melt was first raised 5° C. or 10° C. corresponding to cooling cycle II or III. Then after another five minutes, the melt was cooled again to 900° C. The initial concentration of Al in each of the melts was different. The Al concentration varied between 50–54% at the interface and about 32–36% at the surface while the total overgrowth layer was about 0.001–0.002 inches thick. Zn was subsequently diffused into the surface of these layers at 700° C. for 30 minutes. The external quantum efficiencies and wavelengths of the light emitted from the diodes at 300° K. made from these wafers were measured.

Figure 3:
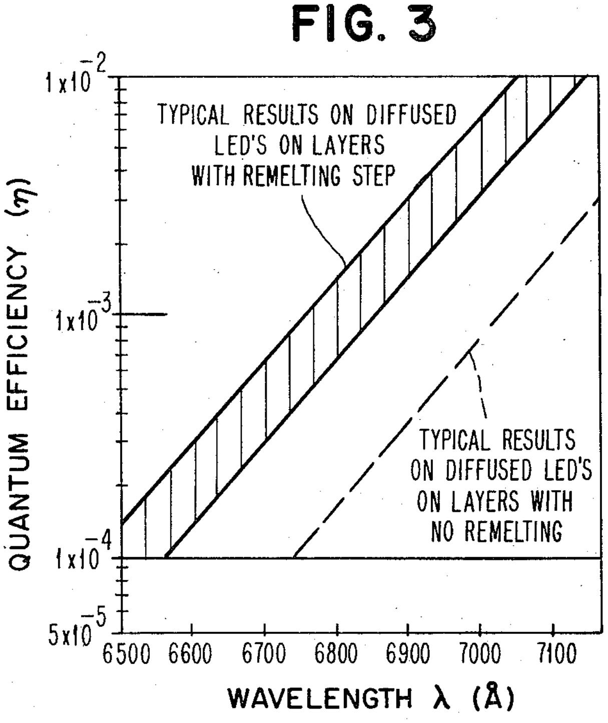
FIG. 3 is a quantum efficiency-wavelength plot of light emitting diodes (LED) made by diffusing dopants into a crystal grown by a remelting step as compared with LED's made by diffusing dopants into a crystal grown without the remelting step.

FIG. 3 is a plot of the relative quantum efficiencies of light-emitting diodes (LED's) made on layers of GaAlAs that used the remelt cycle as compared to LED's made on similar layers that did not use the remelt cycle. The efficiency of diffused diodes made from material grown with a remelting cycle is improved by a factor of five as compared with those diffused diodes that did not have a remelting cycle.

Figure 4:
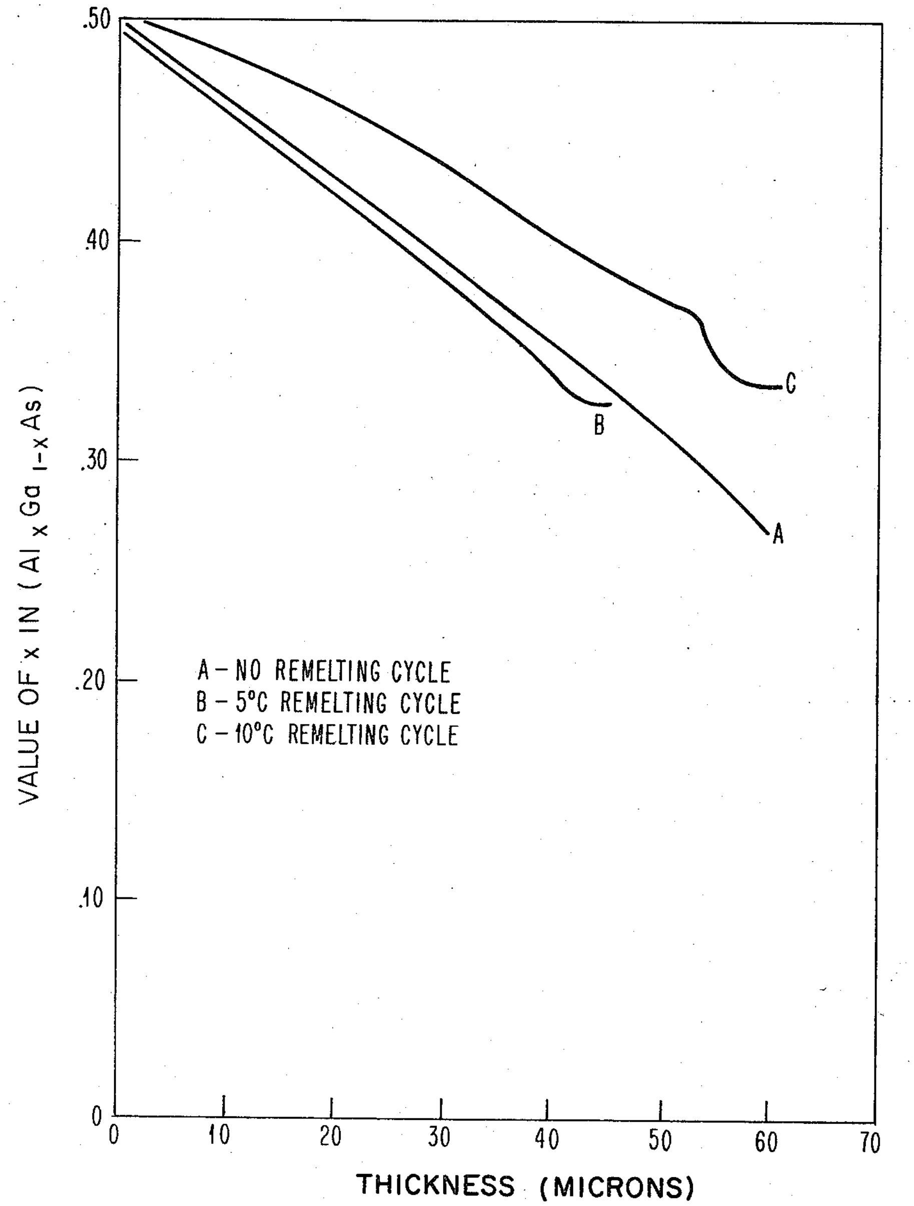
FIG. 4 is a plot of the aluminum profiles of layers grown from the melt with or without a remelting cycle.

FIG. 4 is a plot of aluminum concentration as a function of distance from the substrate as measured by an electron beam probe. Because of the high segregation constant of aluminum, the concentration of Al decreases with distance away from the substrate. Curve A corresponds to the typical Al profile of a layer which was grown using cooling cycle I in FIG. 2. Curve B and C show typical Al profiles of epitaxial layers grown using 5 and 10° C. remelting cycles, respectively, corresponding to cooling cycles II and III in FIG. 2. From the observation of these curves, it is apparent that the consequences of the remelting cycle are twofold: In addition to an abrupt change of the Al concentration, there is also a slowing down of the rate of fall off of the Al concentration after the drop in concentration. In other words, the rate of decrease of the Al concentration of the material grown after this remelting has taken place is much smaller than the rate of decrease prior to the remelting cycle.

Both of these two changes in the Al concentration profile probably are the major factors which contribute to the large increase in quantum efficiency of diodes made from material having had a remelting cycle. The diffused junction is normally located in the regrown region just after the abrupt change of Al concentration. If the diffused junction is too deep, excessive light absorption will take place in the region of the junction. If such diffused junction is too shallow, injection from the surface contact of the diode will cause an inferior LED to be made. It is important that the thickness of the regrown layer be optimized, for example, of the order of a fraction to five microns so that subsequent diffusions will not introduce excessive impurities which would ultimately cause free-carrier absorption, hence, diodes having diminished efficiencies.

Since the radiative recombination occurs in the p-side of the junction, the sudden change in bandgap due to the abrupt drop in Al concentration, which is about 0.02 ev. for a 5° C. remelting step, may enhance the injection of electrons and confine the holes in the p-region so as to increase the radiative recombination. The result is similar to the $Al_xGa_{1-x}As$-GaAS heterojunction lasers where the improvement of current threshhold is attained by the use of heterostructure to increase carrier confinement with suppression of the onset of hole injection. Since Zn is diffused into the region where the remelting has taken place, the light emitted from the junction thus formed would be absorbed less by the material with the flatter Al concentration profile, as seen in Curves B and C of FIG. 4, than the rapidly decreasing Al concentration profile as in Curve A of FIG. 4 which represents no melting cycle. The higher the Al concentration, the higher the bandgap will be so that the light will be least absorbed in those layers that have the flattest profile.

The effect of the remelting cycle on the dislocation density of the grown $Al_xGa_{1-x}As$ were also found to be significant. The dislocation density of the typical overgrowth layer is in the order of $10^5$ cm.$^{-2}$, and it decreases by about a factor of two in the regrown region. One of the reasons that the dislocation density is reduced in the regrown regions may be due to the fact that the remelting and the waiting time provides more time for establishing a better liquid solid interface so that the new material grown will have fewer dislocations in it. This reduction of the dislocation density may improve the quality of the material sufficiently so that subsequent diffusions produce better devices.

In summary, besides the improvement of the quality of the LPE grown material because of reduction of dislocation density, the external quantum efficiency of diffused diodes made from Zn diffusion in the layers which were regrown after a five to ten degrees remelting is improved by a factor of five. This is attributed to the abrupt change of aluminum concentration so that the injections of electrons to the p-side of the p-n junction is enhanced as well as to the leveling effect of the aluminum gradient at the region so that the absorption of light emission at the surface is reduced. Although the invention has been shown and described for the ternary compound GaAlAs, other ternary compounds with similar properties, such as AlGaP and InGaP, may advantageously employ this regrowth method.

What is claimed is:

1. In a method for controlling the composition of a single crystalline ternary compound such as $Al_xGa_{1-x}As$ during liquid phase epitaxial growth comprising the steps of:

providing an equilibrium liquid solution at an elevated temperature consisting of the components of $$Al_xGa_{1-x}As$$

with an n-type dopant therein;

providing a single crystalline solid substrate in said liquid in equilibrium with said liquid at said temperature;

cooling the system of said liquid and said solid at a uniform rate to a predetermined temperature to grow by liquid phase epitaxy a layer of said n-type conductivity;

heating said solution to a temperature sufficiently above said predetermined temperature and maintaining such elevated temperature for sufficient time so as to perform a remelting of a thin surface layer of the epitaxial overgrowth, and uniformly cooling said melt to the vicinity of said predetermined temperature to regrow another thin layer of epitaxial overgrowth over that layer obtained during said heating step, whereby such regrowth layer is of the order of a fraction to five microns thick.

2. In a method for controlling the composition of a single crystalline ternary compound such as $Al_xGa_{1-x}As$ during liquid phase epitaxial growth comprising the steps of:

providing an equilibrium liquid solution at an elevated temperature consisting of the components of $Al_xGa_{1-x}As$ with an n-type dopant therein;

providing a single crystalline solid substrate in said liquid in equilibrium with said liquid at said temperature;

cooling the system of said liquid and said solid at a uniform rate to a predetermined temperature to grow by liquid phase epitaxy a layer of said n-type conductivity;

heating said solution to a temperature of 5° to 10° C. above said predetermined temperature and maintaining such elevated temperature for approximately five minutes so as to perform a remelting of a thin surface layer of the epitaxial overgrowth, and uniformly cooling said melt to the vicinity of said predetermined temperature to regrow another thin layer of epitaxial overgrowth over that layer obtained during said heating step, whereby such regrowth layer is of the order of a fraction to five microns thick.

3. In a method for controlling the composition of a single crystalline ternary compound such as $Al_xGa_{1-x}As$ during liquid phase epitaxial growth comprising the steps of:

providing an equilibrium liquid solution at an elevated temperature of about 950°–960° C. consisting of the components of $Al_xGa_{1-x}As$ with an n-type dopant therein;

providing a single crystalline solid substrate in said liquid in equilibrium with said liquid at said temperature;

cooling the system of said liquid and said solid at a uniform rate to a temperature of approximately 900° C. to grow by liquid phase epitaxy a layer of said n-type conductivity;

heating said solution to a temperature of 5°–10° C. above 900° C. and maintaining such elevated temperature for approximately five minutes so as to perform a remelting of a thin surface layer of the epitaxial overgrowth, and uniformly cooling said melt to the vicinity of said 900° C. to regrow another thin layer of epitaxial overgrowth over that layer obtained during said heating step, whereby such regrowth layer is of the order of a fraction to five microns thick.

4. The method of claim 3, wherein said cooling rate is substantially 0.4° C./min.

5. In a method for controlling the composition of a single crystalline ternary compound such as $Al_xGa_{1-x}As$ during liquid phase epitaxial growth comprising the steps of:

providing an equilibrium liquid solution at an elevated temperature consisting of the components of $Al_xGa_{1-x}As$ with an n-type dopant therein;

providing a single crystalline solid substrate in said liquid in equilibrium with said liquid at said temperature;

coolng the system of said liquid and said solid at a uniform rate to a predetermined temperature to grow by liquid phase epitaxy a layer of said n-type conductivity;

heating said solution to a temperature sufficiently above said predetermined temperature and maintaining such elevated temperature for sufficient time so as to perform a remelting of a thin surface layer of the epitaxial overgrowth, uniformly cooling said melt to the vicinity of said predetermined temperature to regrow another thin layer of epitaxial overgrowth over that layer obtained during said heating step, whereby such regrowth layer is of the order of a fraction to five microns thick, and diffusing a p-type dopant into the region of said remelted thin surface layer of epitaxial overgrowth.

6. In a method for controlling the composition of a single crystalline ternary compound such as $Al_xGa_{1-x}As$ during liquid phase epitaxial growth comprising the steps of:

providing an equilibrium liquid solution at an elevated temperature consisting of the components of $Al_xGa_{1-x}As$ with an n-type dopant therein, providing a single crystalline solid substrate in said liquid in equilibrium with said liquid at said temperature, cooling the system of said liquid and said solid at a uniform rate to a predetermined temperature to grow by liquid phase epitaxy a layer of said n-type conductivity, heating said solution to a temperature of 5° to 10° C. above said predetermined temperature and maintaining such elevated temperature for approximately five minutes so as to perform a remelting of a thin surface layer of the epitaxial overgrowth, uniformly cooling said melt to the vicinity of said predetermined temperature to regrow another thin layer of epitaxial overgrowth over that layer obtained during said heating step, and diffusing a p-type dopant into the region of said remelted thin surface layer of epitaxial overgrowth.

References Cited

UNITED STATES PATENTS

| | | | |
|---|---|---|---|
| 3,729,348 | 4/1973 | Saul | 148—172 |
| 3,677,836 | 7/1972 | Lorenz | 148—172 X |
| 3,537,029 | 10/1970 | Kressel et al. | 148—171 UX |

FOREIGN PATENTS

| | | | |
|---|---|---|---|
| 1,149,109 | 4/1969 | Great Britain | 148—171 |

GEORGE T. OZAKI, Primary Examiner

U.S. Cl. X.R.

148—171; 117—201; 252—62.3 GA